United States Patent [19]

Azar

[11] Patent Number: 4,935,211
[45] Date of Patent: Jun. 19, 1990

[54] FLUOROGYPSUM WASTE SOLIDIFICATION MATERIAL

[76] Inventor: David G. Azar, 11023 Major Oaks Dr., Baton Rouge, La. 70815

[21] Appl. No.: 299,127

[22] Filed: Jan. 23, 1989

[51] Int. Cl.$^5$ .......................... C01F 11/46; C04B 1/06
[52] U.S. Cl. ..................................... 423/171; 106/786; 106/775; 210/751; 423/172; 423/485; 423/555
[58] Field of Search ................ 106/109, 110; 210/711, 210/751, 770, 716; 405/128, 129, 263, 264; 423/170, 171, 172, 483, 484, 485, 555

[56] References Cited

U.S. PATENT DOCUMENTS

| | | | |
|---|---|---|---|
| 1,471,201 | 10/1923 | Fruterman | 210/693 |
| 3,300,279 | 1/1967 | Parisot | 423/485 |
| 3,720,609 | 3/1973 | Smith | 210/59 |
| 3,732,697 | 5/1973 | Dickson | 61/35 |
| 3,855,391 | 12/1974 | Selmeczi et al. | 423/171 |
| 3,947,284 | 3/1976 | Kitsugi | 106/89 |
| 4,016,240 | 4/1977 | Hinsche et al. | 106/109 |
| 4,028,130 | 6/1977 | Webster | 106/120 |
| 4,080,422 | 3/1978 | McCleary | 423/172 |
| 4,124,405 | 11/1978 | Quienot | 106/111 |
| 4,149,968 | 4/1979 | Kupier | 210/28 |
| 4,229,295 | 10/1980 | Krofchak | 210/723 |
| 4,402,922 | 9/1983 | Gaynor et al. | 106/109 |
| 4,436,645 | 3/1984 | Ceaser | 252/179 |
| 4,457,781 | 7/1984 | Palmer | 106/109 |
| 4,460,551 | 7/1984 | Boese et al. | 423/485 |
| 4,465,518 | 8/1984 | Miyoski | 106/89 |
| 4,491,571 | 1/1985 | Suzuki et al. | 423/485 |
| 4,517,095 | 5/1985 | Ceaser | 210/751 |
| 4,523,906 | 6/1985 | Petrovic | 423/171 |
| 4,615,809 | 10/1986 | King | 210/751 |
| 4,623,469 | 11/1986 | Conner | 210/751 |

FOREIGN PATENT DOCUMENTS

| | | | |
|---|---|---|---|
| 1467292 | 10/1970 | Fed. Rep. of Germany | 423/555 |
| 5044194 | 4/1975 | Japan | 423/555 |
| 51-39596 | 4/1976 | Japan | 423/555 |
| 53-89256 | 8/1978 | Japan | 210/751 |
| 51-24599 | 9/1980 | Japan | 210/751 |

OTHER PUBLICATIONS

PCT Application, Publication No. WO83/02266, Application No. PCT/US82/01776, Bruce et al., 7-1983.

*Primary Examiner*—Peter Hruskoci
*Assistant Examiner*—Joseph Drodge
*Attorney, Agent, or Firm*—David L. Ray

[57] ABSTRACT

A process, and the product produced thereby, for the preparation of a waste solidification material from hardened fluorogypsum as a by-product of the manufacture of hydrofluoric acid by reacting fluorospar with sulfuric acid, removing hydrogen fluoride from the reaction product, slurrying the by-product with water, placing the slurried by-product fluorogypsum in settlement ponds until the fluorogypsum hardens, the hardened fluorogypsum having a pH of about 3 to about 5, including heating the hardened fluorogypsum to evaporate substantially all water physically mixed with the fluorogypsum and further heating the fluorogypsum to reduce the water chemically bound to calcium sulfate in the fluorogypsum to from about 0.5% to about 9% by weight.

19 Claims, No Drawings

FLUOROGYPSUM WASTE SOLIDIFICATION MATERIAL

BACKGROUND OF THE INVENTION

1. Field of the Invention

The present invention relates to a material for the solidification of waste products. In particular, the present invention relates to a material containing calcium sulfate useful for the solidification of liquid industrial waste and sludge.

2. Description of the Related Art

The calcium sulfate from which the material of the invention is made is a by-product produced from the reaction of fluorspar with sulfuric acid in the production of hydrofluoric acid. The hydrogen fluoride is removed after the reaction, while the by-product, which is predominantly calcium sulfate, is slurried with water and pumped into disposal ponds. Excess water eventually evaporates and/or hydrates with calcium sulfate in the slurry and the by-product hardens. The by-product contains mostly calcium sulfate anhydrite and calcium sulfate having water chemically combined therewith, plus small quantities of fluorine containing compounds and small concentrations of sulfuric acid. The by-product is sometimes referred to herein as fluorogypsum. The pH of the fluorogypsum is typically from about 3 to about 5.

Disposal ponds for fluorogypsum occupy large areas of useful land and commonly require monitoring and maintenance by the owner. The disposal ponds are constantly increasing in size and quantity of fluorgypsum contained as hydrofluoric acid production continues.

Many materials are known for treating liquid and semi-liquid waste and sludge to solidify the waste and render the waste fit for disposal and/or containment. Exemplary of the methods and materials for treating liquid and semi-liquid waste and/or sludge are the following U.S. patent:

U.S. Pat. No. 4,623,469 discloses a method for treating liquid and semi-liquid wastes to render them fit for ultimate disposal, by first determining the ionic charge of the waste counter ions. An appropriate suspension of emulsified asphalt particles is then selected having an opposite particle charge to the ionic charge of the waste counter ions. The waste is then mixed with the selcted suspension of emulsfied asphalt particles at ambient temperature in an amount sufficient to react with the waste counter ions and coalesce into a hydrophobic mass. It is disclosed that multivalent metal ions such as divalent calcium ions are preferred for neutralizing anionic asphalt emulsion. Lime is a preferred source of such calcium ions. Sulphate ions such as found in calcium sulphate (gypsum) are a preferred neutralizing additive for cationic asphalt emulsion.

U.S. Pat. No. 4,615,809 discloses a method for stabilization of sludge such as organic sludges including combining the sludge with Portland cement, fly ash, calcium sulfate dihydrate, and lime, optimally with stabilizing agents such as clay, recycled rubber, and asphaltene, and an adsorbent for organic substances. The stabilized sludge compositions prepared in accordance with this method are characterized by a soil-like consistency and low-volume expansion relative to sludge volumes prior to stabilization.

U.S. Pat. No. 4,465,518 discloses a process for strengthening soft soil. A high water content soft soil, for example from the sea or river bed, may be improved in strength by incorporating therein a finely divided, quenched iron blast furnace slag treated with sulfuric acid, and a Portland cement. The sulfuric acid-treated slag is a product obtained by reacting a finely divided, quenched iron blast furnace slag, such as a water-granulated iron blast furnace slag, with sulfuric acid to convert a part of its calcium components into gypsum.

U.S. Pat. No. 4,457,781 discloses a method for solidifying waste slime suspension. Solidification of colloidal argillaceous matter in essentially non-settling, aqueous slime media into a solid stable matrix is accomplished by mixing such slime with a hydratable calcium sulfate and hydrating to form an interlocking strength bearing matrix. The method is particularly useful for coalescing phosphatic clay slimes with hydratable calcium sulfate prepared form the co-produced waste phosphogypsum.

U.S. Pat No. 4,436,645 discloses a method for containing compositions for removal of pollutants from waste waters and methods of utilizing same. Novel compositions containing fluoride are provided for the removal of organic and heavy metal pollutants from waste waters and methods of utilizing same. The compositions comprise components selected from ion exchange absorbent gels, cements, water soluble fluoride containing salts and, optionally, alkali metal ortho-phosphates. The procedures of the present invention yield not only clarified waters but provided a sludge which can be disposed of under environmentally acceptable conditions.

On column 2, lines 61 et seq., it is stated that the cementitious component may be either a cement or a gypsum, however, this should be supplemented by a fourth component taken from either group (a) for example, diatomaceous silica or from the cementitious group, (b) for example, hydrated lime. In each it is preferred that the fourth component be present in the same proportion (approximately) as the clay component.

U.S. Pat. No. 4,402,922 discloses a process for rapid conversion of fluoroanhydrite to gypsum in which fluoroanhydrite is contacted with the fluid reaction medium slurry containing soluble sulfate ions and a substantial proportion of small gypsum seed crystals to rapidly hydrate a large proportion of the fluoroanhydrite to a coarser, substantially pure gypsum. The slurry is clarified to separate coarse purified gypsum reaction product, and the reaction medium is reconstituted and recycled containing gypsum crystals less than the desired product size and constituting about 50–90% of the reconstituted fluid reaction medium. The resultant gypsum is free of harmful soluble and syncrystallized impurities and is acceptable for gypsum board manufacture.

U.S. Pat. No. 4,229,295 discloses a process for treating aqueous sludge comprising a slurry of clay minerals and silica in water including rapidly dispersing throughout the sludge at least one additive compound selected from the group consisting of mineral acids, acid salts of alkaline earth metals, alkaline earth metal oxides and alkaline earth metal hydroxide. The additive is provided in an amount sufficient to cause formation in the sludge of large silicate molecules with resultant solidification of the sludge by gelling and setting into an insert solid material. The formation of calcium sulphate from the reactants is disclosed.

U.S. Pat. No. 4,149,968 discloses a method of converting hazardous industrial and other waste into an inert, non-polluting and useful solid-like product comprising mixing bentonite clays and Portland cements with aqueous solutions or with mixtures containing polluting materials to form a solid mass. The quantities of bentonite and cement control the consolidation of materials and govern physical factors, such as the hardness and the chemical characteristics of the resultant material. The resulting product is chemically and physically stable; a solidified product which is completely insoluble in water, and in which, pollutants are encapsulated in the matrix so that the waste material is render non-polluting and fit for ultimate disposal.

U.S. Pat. No. 4,124,405 discloses a process for solidifying aqueous waste and products thereof by treatment with a particulate metallurgical slag under alkaline conditions in the presence of a hydration-promoting agent for the slag, e.g., gypsum.

U.S. Pat. No. 4,028,130 discloses a disposal method and use of sewage sludge wherein digested sewage sludge resulting from sewage plant treatment of municipal sewage is disposed of and used in an ecologically acceptable manner by the incorporation of such sludge in hardenable compositions further including, for example, lime, fly ash, and in some cases, alkaline earth metal sulfate and/or soil or other inert or complimentary additives. These hardenable compositions may be emplaced in an area open to the atmosphere and permitted to cure over a period of time to act as land file or as road base materials. In column 2, lines 35 through 38 states that preferably also these compositions include (based on weight percentage the solids) calcium sulfate (1.5-3% based on the anhydrite) and 20-45% soil.

U.S. Pat. No. 3,947,284 discloses a method for solidifying sludge having a water/solid high ratio and containing a substance having a harmful influence upon the setting of Portland cement by mixing the sludge with hydraulic Portland cement and at least one substance selected from the group consisting of alkali sulphate, gypsum dihydrate and insoluble gypsum anhydride.

U.S. Pat. No. 3,855,391 discloses a sludge stabilization with gypsum wherein a sulfur dioxide scrubber waste sludge is stabilized using plaster of paris to product a stable landfill material. The scrubbing liquor is provided with a catalyst which optimizes the production of calcium sulfate as a solid sulfur compound in the scrubber waste. The calcium sulfate is separated from the waste sludge and converted by heating to plaster of paris, which is remixed with the sludge to stabilize the material as a landfill.

U.S. Pat. No. 3,732,697 discloses a waste disposal method and facility comprises preparing a site with a relative flexible liner by spreading successive layers of the sandy soil admixed with potable water on the in situ native soil of the disposal site surface to provide a liner having a thickness of several feet and mechanically compacting each of the successive layers of sandy clay soil at approximately its optimum density to provide a water-impervious barrier which will protect underground water supplies from chemical contamination by liquid waste materials which are dumped on the top of the liner.

U.S. Pat. No. 3,720,609 discloses a process for treating aqueous chemical waste sludges and the composition produced thereby wherein waste sludge containing small amounts of certain types of reactive material are treated by adding to such sludges materials capable of producing aluminum ions, lime and/or sulfate bearing compounds to produce a composition having a sufficient concentration of sulfate ions, aluminum ions and equivalents thereof, and calcium ions and equivalents thereof. Fly ash is the preferred source of aluminum ions for this purpose. Over a period of time such compositions harden by the formation of calcium sulfo-aluminate hydrates. Hardening of the sludge facilitates its disposition and may permit the reclamation of the land now occupied by large settling ponds for such sludge. Still further, the solidification of such settling ponds may provide permanent land fill which permits immediate use of the land without the necessity for removal of the sludge. Aggregate materials may also be incorporated in the solidified waste.

In column 3, lines 33 to 38, it is stated that materials of various types may be added to raised the available sulfate ions concentration as needed. Typical of these are calcium sulfate anhydrite, calcium sulfate hemihydrate (plaster of paris) and calcium sulfate dihydrate (gypsum).

U.S. Pat. No. 1,471,201 discloses a method of producing a material for the treatment of oils including producing a decolorizing and purifying agent for oils, which consists in first forming a mudded mass from non-spent mineral earth, then subjecting the mudded mass to the action of an acid for the separation therefrom of acid soluble bodies, removing the acid and reaction products from the insoluble portion of the mass by the application of water, thickening the mass by the withdrawal of excess water therefrom, and maintaining the treated body until used in a mudded condition to prevent contact of air with the solid particles thereof.

SUMMARY OF THE INVENTION

In accordance with present invention there is provided a solidification material, and a process for the production of the solidification material, for use in solidifying liquid waste and sludge. The waste solidification material is prepared from fluorogypsum which is a by-product of the industrial production of hydrogen fluoride. In the industrial production of hydrogen fluoride, fluorspar is reacted with concentrated sulfuric acid in heated reaction vessel to co-produce hydrogen fluoride and calcium sulfate. Hydrogen fluoride is removed and the calcium sulfate and impurities are slurried with water which is referred to herein as fluorogypsum.

The process of the present invention includes drying the flurogysum to evaporate water physically bound with the flurogypsum, further drying the fluorogypsum to reduce the chemically bound water to from about 0.5% to about 9% by weight of calcium sulfate, and crushing the resultant material to a desired particle size range. The product produced by the process of the invention may then be mixed with chemical waste sludge and/or liquid to sodidify the chemical waste sludge and/or liquid.

DESCRIPTION OF THE PREFERRED EMBODIMENTS

The material of the invention is made from a by-product produced by the reaction of fluorspar with sulfuric acid in the industrial production of hydrofluoric acid. The hydrogen fluoride is removed after the reaction, while the by-product, which is predominantly calcium sulfate, is slurried with water and pumped into disposal ponds. Excess water eventually evaporates and/or hydrates with calcium sulfate in the slurry and the by-product hardens. The dry by-product contains about 99% by weight calcium sulfate anhydrite and calcium sulfate having water chemically combined therewith, plus small quantities of fluorine containing compounds small concentrations of sulfuric acid, or other trace elements and compounds. The by-product is sometimes referred to herein as fluorogypsum. The pH of the fluorogypsum is typically from about 3 to about 5.

In accordance with the invention, fluorogypsum is first heated to evaporate water physically mixed with the fluorogypsum. Secondly, heating is continued to partially remove water chemically bound with calcium sulfate. If all water chemically bound with calcium sulfate is removed, the end product does not efficiently solidify wastes. It is important that only from about 0.5% to about 9% by weight of water remains chemically bound to calcium sulfate for the resultant product to efficiently solidify wastes; more preferably, from about 1.0% to about 9.0% by weight of water remains chemically bound to calcium sulfate; most preferably, from about 1.5% to about 6.0% by weight of water remains chemically bound to calcium sulfate.

After the chemically bound water is reduced to the desired range, the solidification material of the invention is crushed or sized to a particle size of from bout 5000 microns to about 37 microns, more preferably from about 1000 microns to about 37 microns, most preferably from about 150 microns to about 37 microns.

In the following examples 1–25, the physically mixed water was first removed by heating the fluorogypsum in an oven at a temperature of about 90° F. Once the physically mixed water was removed, the temperature in the oven was raised to above 105° F. which is the temperature above which the chemically bound water will be released.

In the following examples 1–25, "Set" was determined by mixing about 50 grams of the dried fluorogypsum with about 40 grams of water, and the mixture was allowed to stand at room temperature of about 72° F. The mixture is observed after about one hour to determine if the mixture hardens. If the mixture hardens sufficiently to support a load of about 50 pounds per square inch, the notation "good" is made in the column labeled "Set". If the mixture is soft, the notation "poor" is made in the column labeled "Set".

The percentage weight loss is the percentage decrease in weight of the sample which occurs after heating due to the chemically bound water being released.

The percentage chemical water loss is the weight percent of chemically bound water remaining in the waste solidification material after heating.

HEATING TIME FOR REMOVING CHEMICALLY BOUND WATER IN DRY FLUOROGYPSUM

| EXAMPLE NO. | HEATING TIME MINUTES | TEMP. | SAMPLE WEIGHT (GRAMS) | % WEIGHT LOSS | % CHEM. WATER LOSS | SET |
| --- | --- | --- | --- | --- | --- | --- |
| 1 | 5 min | 1000° F. | 50.0 | 10.6 | 0 | Poor |
| 2 | 10 min. | 1000° F. | 50.0 | 20.4 | 2.3 | Good |
| 3 | 5 min. | 1100° F. | 50.0 | 9.6 | 9.6 | Poor |
| 4 | 10 min. | 1100° F. | 50.0 | 15.8 | 2.8 | Good |
| 5 | 15 min. | 1100° F. | 5.0 | 16.8 | 3.7 | Good |
| 6 | 30 min. | 284° F. | 100 | 8.7 | 2.7 | Good |
| 7 | 5 min. | 1000° F. | 50.0 | 10.0 | 0 | Poor |
| 8 | 10 min. | 1000° F. | 50.0 | 21.4 | 5.6 | Good |
| 9 | 10 min. | 1000° F. | 50.0 | 26.7 | 6.9 | Good |
| 10 | 8 min. | 850–900° F. | 50.0 | 13.8 | 100 | Poor |
| 11 | 10 min. | 850–900° F. | 50.0 | 18.0 | 1.4 | Good |
| 12 | 15 min. | 859–900° F. | 50.0 | 25.0 | 6.7 | Good |
| 13 | 5 min. | 700° F. | 50.0 | 8.8 | 0 | Poor |
| 14 | 10 min. | 700° F. | 50.0 | 15.0 | 100 | Poor |
| 15 | 13 min. | 850° F. | 50.0 | 16.0 | 3.7 | Good |
| 16 | 15 min. | 850° F. | 50.0 | 9.6 | 2.1 | Good |
| 17 | 5 min. | 850° F. | 50.0 | 8.0 | 0 | Poor |
| 18 | 5 min. | 1100° F. | 50.0 | 15.0 | 3.5 | Good |
| 19 | 10 min. | 1100° F. | 50.0 | 17.0 | 3.9 | Good |
| 20 | 1 min. | 1300° F. | 50.0 | 3.0 | 0 | Poor |
| 21 | 3 min. | 1300° F. | 50.0 | 9.0 | 1.2 | Good |
| 22 | 5 min. | 1300° F. | 50.0 | 14.0 | 3.5 | Good |
| 23 | 1 min. | 1400° F. | 50.0 | 5.0 | 1.6 | Good |
| 24 | 5 min. | 1400° F. | 50.0 | 17.0 | 3.9 | Good |
| 25 | 1 min. | 1800° F. | 50.0 | 17.0 | 3.9 | Good |

EXAMPLE 26

Fluorogypsum produced as a by-product of making hydrofluoric acid by reacting fluorspar with sulfuric acid was placed in the entrance of a 48 foot long rotating furnace heated at its entrance to about 1000° F. The fluorogypsum traversed 48 feet through the furnace in about 15 minutes. Exit temperature of the furnace was 200° to 300° F.

The waste solidification material was dry, i.e., it continued substantially no physically mixed water. Chemically bound water was about 7% by weight.

Particle size of the sample ranged from about 37 microns to about 250 microns. Density was 62 pounds per cubic feet.

Fifty grams of the waste solidification material was mixed with about 35 grams of water, and the mixture became solid within five minutes at an ambient temperature of about 72° F. and ambient pressure of approximated sea level.

When substantially all (at least 99.5%) the physically mixed water is removed from fluorogypsum, there still remains 11–12% by weight water chemically bound to calcium sulfate. The fluorogypsum will bind or absorb only about 20–30% by weight water when the 11–12% chemically bound water is present in the fluorogypsum.

When the water chemically bound to the calcium sulfate is reduced to about 0.5 to about 9% by weight, the waste solidification material of the invention will absorb or bind water in the amount of about 90% to 100% of the weight of the waste solidification material.

Normally, since fluorogypsum storage piles are uncovered and exposed to the atmosphere, the amount of physically mixed water in fluorogypsum fluctuates depending upon the climate. For example, more water is physically mixed with fluorogypsum during the wet winter months than in the drier, hotter months. However, no matter how much physically mixed water is present, physically water should be removed before the chemically bound water can be released.

Although the preferred embodiments of the present invention have been disclosed and described in detail above, it should be understood that the invention is in no sense limited thereby, and its scope is to be determined by that of the following claims:

What is claimed is:

1. A process for the preparation of a waste solidification material from hardened fluorogypsum having a pH of from about 3 to about 5 produced as a by-product of the manufacture of hydrofluoric acid by reacting fluorospar with sulfuric acid, removing hydrogen fluoride from the reaction product, slurrying the by-product fluorogypsum with water and placing the slurry product in settlement ponds until the by-product fluorogypsum hardens, comprising:
   a. heating said hardened fluorogypsum having a pH of about 3 to about 5 for a time sufficient to evaporate substantially all water physically mixed with said hardened fluorogypsum, and
   b. further heating said hardened fluorogypsum at a temperature above 105° F. for a time sufficient to reduce water chemically bound to calcium sulfate in said hardened fluorogypsum to from about 0.5% to about 9% by weight.

2. The process of claim 1 wherein said waste solidification material is crushed to a particle size range of from about 5000 microns to about 37 microns.

3. The process of claim 2 wherein said waste solidification material has a particle size range of from about 1000 microns to about 37 microns.

4. The process of claim 1 wherein said water chemically bound to said calcium sulfate in said fluorogypsum is reduced to from about 1.0% to about 9.0% by weight.

5. The process of claim 4 wherein said waste solidification material has a particle size range of from about 1000 microns to about 37 microns.

6. The process of claim 4 wherein said waste solidification material has a particle size range of from about 150 microns to about 37 microns.

7. The process of claim 6 wherein said water chemically bound to said calcium sulfate in said fluorogypsum is reduced to from about 1½% to about 6.0% by weight.

8. The process of claim 1 wherein said water chemically bound to said calcium sulfate in said fluorogypsum is reduced to from about 1½% to about 6.0% by weight.

9. The process of claim 1 wherein said waste solidification material has a particle size range of from about 150 microns to about 37 microns.

10. A material suitable for use as a waste solidification material comprising:
    a. substantially dry, hardened, particulate fluorogypsum containing, in combination, about 99% by weight calcium sulfate anhydrite and calcium sulfate having water chemically bound to said calcium sulfate, said water chemically bound to said calcium sulfate being present in an amount of from about ½% to about 9% by weight,
    b. said waste solidification material having a particle size range of from about 5000 microns to about 37 microns, and
    c. said material having a pH of from about 3 to about 5.

11. The product of claim 10 wherein said water chemically bound to said calcium sulfate is reduced from about 1½% to about 6% by weight.

12. The product of claim 10 wherein said waste solidification material has a particle size range of from about 1000 microns to about 37 microns.

13. The product of claim 10 wherein said waste solidification material has a particle size range of from about 150 microns to about 37 microns.

14. The product of claim 10 wherein said water chemically bound to said calcium sulfate is from about 1% to about 9% by weight.

15. A process for the preparation of a waste solidification material from hardened fluorogypsum having a pH of from about 3 to about 5 produced as a by-product of the manufacture of hydrofluoric acid by reacting fluorospar with sulfuric acid, removing hydrogen fluoride from the reaction product, slurrying the by-product fluorogypsum with water, and placing the slurried product in settlement ponds until the by-product fluorogypsum hardens, said hardened fluorogypsum having a pH of from about 3 to about 5, comprising heating said fluorogypsum in a rotating furnace at a temperature above 105° F. for a time sufficient to reduce water chemically bound to calcium sulfate in said hardened fluorogypsum to from about 0.5% to about 9% by weight.

16. The process of claim 15 wherein said waste solidification material has a particle size range of from about 1000 microns to about 37 microns.

17. The product of claim 16 wherein said water chemically bound to said calcium sulfate is from about 1.0% to about 9.0% by weight.

18. The process of claim 15 wherein said waste solidification material has a particle size range of from about 150 microns to about 37 microns.

19. The product of claim 18 wherein said water chemically bound to said calcium sulfate is from about 1½% to about 6.0% by weight.

* * * * *